United States Patent
Pavlicevic et al.

(10) Patent No.: US 6,322,610 B1
(45) Date of Patent: Nov. 27, 2001

(54) INTEGRATED DEVICE TO INJECT OXYGEN, TECHNOLOGICAL GASES AND SOLID MATERIAL IN POWDER FORM AND METHOD TO USE THE INTEGRATED DEVICE FOR THE METALLURGICAL PROCESSING OF BATHS OF MOLTEN METAL

(75) Inventors: Milorad Pavlicevic; Stefano Morsut, both of Udine; Alfredo Poloni, Fogliano di Redipuglia, all of (IT)

(73) Assignee: Danieli & C. Officine Meccaniche SpA, Buttrio (IT)

( * ) Notice: Subject to any disclaimer, the term of this patent is extended or adjusted under 35 U.S.C. 154(b) by 0 days.

(21) Appl. No.: 09/436,255

(22) Filed: Nov. 3, 1999

(30) Foreign Application Priority Data

Nov. 10, 1998 (IT) .............................. UD98A0194

(51) Int. Cl.[7] ...................................... G21C 5/32
(52) U.S. Cl. ......................... 75/554; 266/222; 266/225; 75/414
(58) Field of Search .................... 266/219, 221, 266/222, 223, 225; 75/414, 554

(56) References Cited

U.S. PATENT DOCUMENTS

| | | |
|---|---|---|
| 4,251,271 | 2/1981 | Floyd . |
| 4,730,784 | 3/1988 | Bock et al. . |
| 5,904,895 * | 5/1999 | Gitman et al. ..................... 266/225 |

FOREIGN PATENT DOCUMENTS

| | | |
|---|---|---|
| 29807145 | 7/1998 | (DE) . |
| 19755876 | 6/1999 | (DE) . |
| 145382 | 6/1985 | (EP) . |
| 0597270 | 5/1994 | (EP) . |
| 764815 | 3/1997 | (EP) . |
| 0874194 | 10/1998 | (EP) . |
| 0879896 | 11/1998 | (EP) . |
| 2644558 | 9/1990 | (FR) . |
| 1007241 | 10/1965 | (GB) . |
| 1548215 | 3/1990 | (SU) . |
| 9702365 | 1/1997 | (WO) . |

\* cited by examiner

*Primary Examiner*—Melvin Andrews
(74) *Attorney, Agent, or Firm*—Stevens, Davis, Miller & Mosher, LLP (57) ABSTRACT

Device and relative method to inject technological gases and solid material in powder form, in a furnace used in steel and metallurgical melting processes, comprising an emission element including an outlet mouth arranged at a certain distance from the liquid bath, said emission element being innerly shaped as a double nozzle, respectively first and second, the first nozzle having a convergent/divergent conformation defined by a neck and being predisposed for the emission of a jet of gas at supersonic speed, said second nozzle having at the end a conformation convergent towards the axis of the emission element and being pre-disposed, according to the step of the melting process in progress, for the emission of a jet at subsonic speed either of technological gases alone, such as for example oxygen, or of solid material in powder form on a gassy vehicle, or of liquid in atomized form.

26 Claims, 4 Drawing Sheets

INTEGRATED DEVICE TO INJECT OXYGEN, TECHNOLOGICAL GASES AND SOLID MATERIAL IN POWDER FORM AND METHOD TO USE THE INTEGRATED DEVICE FOR THE METALLURGICAL PROCESSING OF BATHS OF MOLTEN METAL

FIELD OF THE INVENTION

This invention concerns an integrated device to inject oxygen and technological gases in general, and also solid material in powder form, as set forth in the relative main claim.

The invention also concerns the method to use the integrated device for the metallurgical processing of a bath of molten metal.

In the following description we shall refer principally to oxygen, but it is implicit that the device according to the invention can be used also for the injection of any other technological gas, for example air, argon, nitrogen or others, or a mixture thereof, in a metallurgical process which includes a bath of molten metal.

The device according to the invention is suitable to inject, together with the gassy jet of oxygen or other technological gases, a jet of solid material in powder form, such as for example lime powder, carbon powder or similar.

The invention is applied, preferably but not exclusively, in steel working industries and is particularly indicated to be applied in processes to melt steel, for example in electric arc furnaces.

BACKGROUND OF THE INVENTION

It is common practice in electric arc furnaces, and in other applications in steel and metallurgical industries, to inject technological gases and solid material in powder form above and inside the bath of melting metal.

Generally speaking, technological gases should be taken to mean oxygen, nitrogen, argon, methane, propane, air or other gases with like characteristics.

Generally speaking, solid material in powder form should be taken to mean the powders of coke, carbon, iron alloys, lime, dolomite or other materials with like characteristics.

There are many purposes for this injection, among the most important being:
- to provide an energy input for melting;
- to activate the oxidation step and influence the dephosphorization and the desulphurization of the liquid metal;
- to encourage slag foaming;
- to facilitate the melting and shearing of the scrap;
- to encourage the stirring of the bath, thus accelerating the time taken to activate the chemical reactions;
- to actuate decarburation, that is to say, the regulation of the carbon content, and to control the tapping temperature;
- to obtain the burner functioning mode, wherein the oxygen or air enriched with oxygen act as comburents of natural gas, methane, oil, propane, butane, carbon or other solid or gassy fuels.

In the state of the art two main solutions are adopted to inject oxygen or other gases inside a liquid bath:
a) by means of water-cooled lances equipped at the ends with a nozzle, for example of the convergent/divergent type, suitable to produce a supersonic jet at outlet;
b) by using lances of the consumable type.

Using water-cooled lances entails the following disadvantages:
- the need for manipulation;
- the gassy jet loses energy due to the distance from the bath, which often implies it is impossible for the jet to penetrate inside the bath;
- large quantities of cooling water are needed to prevent the tip of the lance from being destroyed due to the heat and the mechanical stresses;
- danger of explosions caused by possible water leakages;
- if the lance is very close to the bath there is a risk of damage due to the heat, the tip may be washed, encrustations of steel may form and there is a risk of erosion;
- if the lance is very close to the scrap, the gassy jet may be deflected and even reflected against the end or the side of the lance and therefore cause damage thereto;
- another lance is needed for the combustion of the CO which escapes from the bath;
- other devices are needed to inject the solid material in powder form.

The disadvantages of consumable lances are as follows:
- high cost of the parts which are consumed;
- it is difficult to determine the exact positioning of the tip of the lance;
- the method is not very efficient at distributing the point of impact of the jet;
- due to overheating the lance may bend;
- it is necessary to add new segments of lance as it is gradually consumed; this requires a wide use of equipment and manipulators which are costly and bulky;
- further devices are needed for the post-combustion and injection of the solid material in powder form.

Of the two solutions, in recent years the use of supersonic lances has particularly developed; with these it is possible to inject the necessary quantity of oxygen by means of a jet with a speed higher than that of the sonic speed of the fluid in the relevant conditions of supply temperature and pressure.

However, with present-day technology, the oxygen is not injected an optimum manner of functional to the melting process.

In fact, in systems known to the stat of the art, the impulse of the jet of oxygen is insufficient to penetrate the bath of liquid metal to a depth sufficient to ensure that the oxygen is adequately distributed throughout the bath (for example equal to half the overall height of the bath).

At the moment of impact with the surface of the bath, the jet generates impact waves of compression of very high intensity, which cause a dissipation of the jet and a dispersion of the gas on the surface of the bath, so that only a minimum part of the gas penetrates into the liquid bath of molten metal.

This impact against the surface of the bath also causes a loss of coherence and parallelism in the fluid threads in the jet, with a resultant loss in its penetrative ability.

Moreover, the system makes it necessary to mount the supersonic lance on a manipulator, or another mechanical organ which allows the lance to be moved, in order to adjust the outlet distance with respect to the surface of the bath, since the jet of oxygen tends to disperse after a few centimeters, in the order of a few dozen cm, from the outlet of the supersonic nozzle.

For this reason, consolidated practice provides to insert the end part of the supersonic lance inside the layer of slag above the bath to ensure that the oxygen is introduced inside the liquid bath in a sufficiently efficient manner, but in any case this is not an optimum solution.

EP-A-874.194, which discloses the pre-characterizing part of claim 1, describes a burner which can be used on electric arc furnaces comprising a first, inner nozzle with a convergent-divergent development (Laval nozzle) which emits a mixture of oxygen and natural gas, and a second nozzle, coaxial to and outside the first, which emits particulate material.

In this document, the purpose is substantially to allow the flow of particulate material to mix with the primary flow of oxygen and fuel, so that the material can be distributed uniformly in the flame produced by the burner and can be projected as far as possible inside the furnace.

The outer nozzle defines a straight flow path for the particulate material in order to prevent abrasions on the wall due to the passage of said material.

In this document, the flow delivered by the outer nozzle does not form a protective crown for the primary flow delivered by the inner nozzle, but mixes immediately therewith, already inside the burner itself, since it is drawn by the high increase in pressure created by the supersonic acceleration of the oxygen and fuel.

Moreover, this document does not provide variable working options to modify the composition and the development of the flame according to the various steps of the melting process, so that the regulation of the working of the burner is not correlated to the development of the melting cycle and to the different technological requirements which gradually occur.

The present Applicant has designed, tested and embodied this invention to overcome all these shortcomings and to obtain further advantages.

SUMMARY OF THE INVENTION

This invention is set forth and characterized in the respective main claims, while the dependent claims describe other characteristics of the main embodiment.

The purpose of the invention is to achieve an integrated device to inject oxygen and technological gases into a bath of liquid metal which will ensure maximum efficiency and yield, minimum wear and minimum difficulty in use and manipulation.

Another purpose of the invention is to integrate in a single device the following functions: to inject gases, to inject solid fuel in powder form or in particles, to add comburent in the post-combustion process, to inject powders to passivate the slag, and also to function as a burner; these various functions may be carried out in succession by the same device according to the progress of the melting cycle.

With the device according to the invention, in fact, a single module allows to achieve all the steps of the melting process, that is to say, heating the material to be melted, melting and shearing the scrap by injecting high density oxygen, decarburation, slag foaming, injecting solid fuel in powder form or in particles, post-combustion and energy input in the decarburation step.

All or part of the above-mentioned functions can be performed at the same time.

In other words, according to the needs and the specific step of the cycle, the device according to the invention can be made to function either as a burner with a variable stechiometric ratio and a variable flame length, or also as an injector of oxygen only or other technological gas with a high rate of distribution of the gassy flow into the liquid bath, or also as a simultaneous injector of technological gases and powdered fuel, for example to obtain the production of foamy slag or to obtain the passivation of the slag itself.

The device according to the invention therefore allows, in a single body, to integrate the function which in the state of the art are normally performed by three different devices: a supersonic lance to inject a gassy jet, a subsonic lance or burner for post-combustion, and a lance to inject solid fuel such as carbon powder or combustible powders in general.

Using the device according to the invention allows to obtain substantially operating advantages, such as for example the reduction of the work force required, greater safety for the workers, improved working conditions and a greater control over the process.

In terms of the process, using the device according to the invention allows to obtain the following improvements:
  reduction of tap-to-tap time;
  reduction of electric energy consumed;
  reduction of electrode consumption;
  improved penetration of the gassy jet into the bath of metal;
  more accentuated turbulence in the bath, which entails a more uniform temperature and a quicker melting of the scrap;
  greater melting intensity;
  greater productivity and greater efficiency in the use of the oxygen in the bath;
  reduced concentration of oxygen in the liquid bath and therefore better quality of steel;
  when coupled with electromagnetic stirrers, in some cases it allows to eliminate the function of the bottom tuyères;
  reduction of erosion of the refractory;
  greater efficiency in post-combustion and reduction of the carbon oxide in the gases discharged from the furnace;
  reduction of the water cooling of the injection means;
  more efficient use of foamy slag technique.

The device according to the invention allows the simultaneous emission of two jets substantially autonomous and independent, which ensures a good working flexibility and versatility.

The device according to the invention is mounted in an axially fixed manner on the wall of the furnace, and therefore does not need any manipulation, replacement of tubes, insertion of equipment through apertures in the furnace, with the consequent need of keeping the slag door open.

The device is mounted in such a way that its angle of inclination with respect to the surface of the liquid bath can be varied so as to adapt it to the changing conditions which occur inside the furnace during the cycle.

For example, the inclination of the device can be varied during the process in order to reduce the level of the liquid bath so as to maintain substantially constant the angle of incidence of the jet, thus preventing the unwanted phenomenon of the jet itself being reflected.

The device according to the invention can be used in a modular system which provides a plurality of injection points distributed on the periphery of the furnace, which makes the injection system extremely flexible and versatile and reduces the risks of splashes of liquid metal against the walls of the furnace thanks to the fact that it is possible to use lesser smaller amounts of gas for each device.

The device according to the invention allows to emit an extremely energetic gassy jet with a high specific density, which encourages the penetration into the liquid metal and increases efficiency also when there is a smaller quantity of gas introduced.

BRIEF DESCRIPTION OF THE DRAWINGS

These and other purposes and advantages of the invention will become clear from the description of the preferred form of embodiment given as a non-restrictive example, with reference to the attached drawings, wherein.

DETAILED DESCRIPTION OF PREFERRED EMBODIMENTS

With reference to the attached Figures, the device according to the invention is indicated in its entirety by the reference number 10.

The device 10 is suitable to be mounted axially fixed on the walls of a furnace for melting metals, or a recipient in general used to perform metallurgical transformations, and has a nozzle, or emission element 23 at the end, the outlet mouth 11 of which is located at a defined distance from the upper level of the liquid bath and above the overlying layer of slag.

During the operating step, the outlet mouth is located at a height, with respect to the surface of the bath, of between about 0.5 m and 2.5 m.

The angle of incidence of the jet is between about 30° and about 70°, advantageously between 40° and 50°.

The device 10 consists of a metallic body 12 (FIG. 1), suitable to be inserted into an appropriate aperture, sealed with air-tight sealing means and made on the wall of the furnace, and to cooperate with appropriate equipment of a kind known to the state of the art, to manipulate and possibly to insert, remove, direct, etc. the device 10.

With the apertures on the walls of the furnace being air-tight, it is possible to manoeuvre the movable injection organs, drastically reducing the formation of nitrogen oxides or their precursors (the so-called NOx), and thus limiting the dissipation and dispersion of energy from the machine.

Figure 1:
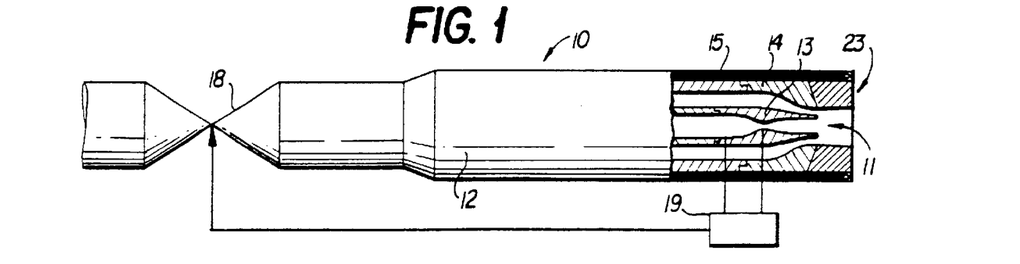
FIG. 1 shows a diagram of an integrated device according to the invention.

On the end part of the metal body 12 the emission element 23 is housed, which is innerly defined by a double nozzle configuration.

To be more exact, the emission element 23 has a first nozzle 13, inside and substantially coaxial, to emit a supersonic jet of oxygen, gas containing oxygen, or other technological gases, and a second annular nozzle 14 outside and substantially coaxial with the first nozzle 13, to emit a subsonic jet of oxygen or other substances, for example solid fuel in particles or other type of fuel.

In a preferential embodiment, the speed at which the flow exits from the second nozzle 14 is between 0.3 and 0.9 Mach.

The nozzles, the first 13 and the second 14, are suitably sized geometrically according to mathematical criteria to obtain maximum operational and technological efficiency, according to the method of calculation described and claimed in a parallel application in the name of this Applicant.

To be more exact, the geometry of the channel defined by the second nozzle 14 has a profile such as to obtain a desired correlation of the gradient of speed between the supersonic flow, the subsonic flow and the still air inside the furnace.

The emission element 23 is attached to the body 12 in such a way that it can be easily and rapidly attached/detached, thus ensuring that it can be replaced in the event of wear or breakage even without interrupting the functioning of the furnace.

The nozzles 13 and 14 are advantageously made of copper, stainless steel or other similar metal.

According to a variant, the nozzles 13 and 14 are made entirely or partly of ceramic material, so as to reduce the need for cooling also in those steps wherein the device 10 is not working, so as to facilitate the replacement of the nozzles 13 and 14.

The two nozzles 13 and 14 are arranged inside a containing shell 15 inside which the channels 16 for the cooling water to circulate in are made.

Figure 2:
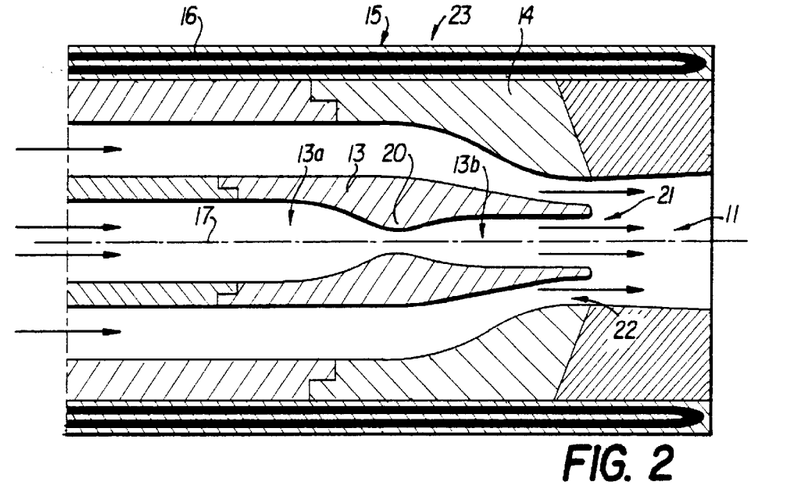
FIG. 2 is an enlarged scale view of the terminal section of the nozzle associated with the device shown in FIG. 1.

According to the invention, the first nozzle 13, or supersonic nozzle, has a convergent/divergent conformation (Laval-type) defined by a neck 20 made at a position upstream of the terminal section 21 of the nozzle 13; the neck 20 defines a convergent part 13a upstream and a divergent part 13b downstream which in turn forms the terminal section 21.

The second nozzle 14, or subsonic nozzle, outside and concentric with the first 13, is convergent in shape wherein the terminal section 22 converges towards the axis 17 of the first nozzle 13.

In one form of embodiment, the respective terminal sections 21 and 22 of the nozzles 13 and 14 are arranged inside the outlet mouth 11 of the emission element 23 in such a way that the respective flows interact and expand inside the inner element 23 itself, before they are introduced inside the atmosphere of the furnace.

The primary gassy jet emitted by the first nozzle 13 has an outlet speed which can be regulated by acting on the pressure of the gas directly upstream of the nozzle 13 itself.

In the embodiment shown in FIG. 1, this pressure is regulated by a throttling valve 18 arranged on the delivery pipe feeding the gas to the first nozzle 13. The throttling valve 18 is regulated in feedback by a control unit 19 according to signals related to the instantaneous pressure of the gas as monitored respectively upstream and in correspondence with the neck 20.

This system of regulation in feedback ensures that the characteristics of the jet are maintained irrespective of the conditions of pressure/temperature/density inside the furnace so that the expansion of the supersonic jet takes place entirely inside the emission element 23.

As the gas passes through the neck 20, the flow accelerates from subsonic to supersonic in correspondence with the outlet section 21 of the first nozzle 13.

The supersonic flow is thermally and operationally protected by the outer ring created by the secondary, subsonic and convergent flow emitted by the second nozzle 14, so that the supersonic flow is less influenced and less able to be influenced by the operating conditions inside the atmosphere of the furnace and the bath.

Moreover, the secondary gas flow makes possible to reduce the speed gradients and therefore to reduce energy loss of the primary jet.

In this way, the quantity of motion of the primary jet is preserved, simultaneously excluding its interaction with surrounding gases.

Figure 3:
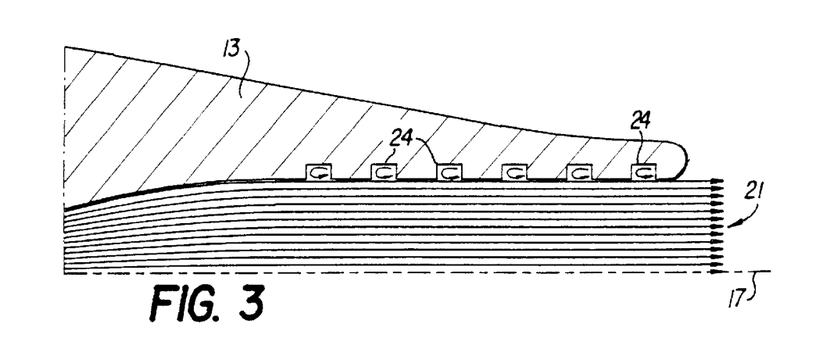
FIG. 3 shows the arrangement of the channels in correspondence with the divergent section of the nozzle shown in FIG. 2.

According to the variant shown with a detail in FIG. 3, in the divergent end part of the first nozzle 13 a plurality of circumferential grooves 24 are made with the function of stabilising that underlayer of the flow leaving the first nozzle 13 which is nearest the wall.

The function of the primary jet emitted by the first nozzle 13 is substantially to penetrate the bath to about half of its overall depth and to spread inside the bath, ensuring an efficiency of use which is substantially 100%.

This injection substantially takes place without splashing, since the penetration of the jet is determined only by the quantity of motion possessed by the gas delivered, and not by chemical reactions.

The supersonic jet also has the function of creating a depression in the bath, suitable to increase the speed of decarburation, and also to promote stirring in the bath with exchange of mass and of energy, encouraging the homogenization and uniformity of the bath.

At the same time, an increase is obtained in the foaming effect and in the homogenization of the overlying slag.

The secondary flow emitted by the second convergent nozzle 14 creates an outer protective ring, concentric to the jet emitted by the first nozzle 13, and has the main function of surrounding the supersonic flow, protecting it thermally and fluido-dynamically from the surrounding disturbing agents; this increases the independence of the supersonic jet from the conditions in the atmosphere of the furnace.

The shape of the outlet section 22 of the second nozzle 14 can be suitably chosen, for example, circular, elliptic or other, according to the desired position and direction of the flow.

The secondary flow emitted from the second nozzle 14 reaches the overlying layer of slag, starting and encouraging the combustion of the CO emerging from the bath and giving an extra energy contribution for the melting process.

With the nozzles 13 and 14 shaped according to the invention, the supersonic jet emerging from the first nozzle 13 maintains the fluid threads substantially parallel for a greater length than what happens in traditional systems, without there being any dispersion of the tubular flow caused by any other gas entering inside the volume of the jet itself.

Moreover, when the jet is introduced into high density fluid systems (for example water, liquid metal or other), the supersonic jet of the first nozzle 13 reaches greater depths, since this jet is equipped with a greater quantity of motion and is completely surrounded by the subsonic jet emitted by the second nozzle 14.

This is completely different from what happens in traditional systems, where the primary flow of gas, already turbulent as it leaves the lance, generates a cavity in correspondence with the zone where it penetrates into the bath, thus causing a large part of the oxygen injected to leave the injection area without exerting the desired effect in the bath of liquid metal and hence causing a reduction in efficiency.

The device 10, thanks to its emission characteristics described above, allows to work at a greater distance from the bath, and does not necessarily require a manipulator as used at present, with a consequent reduction in wear and consumption of its mechanical parts.

Figure 4:
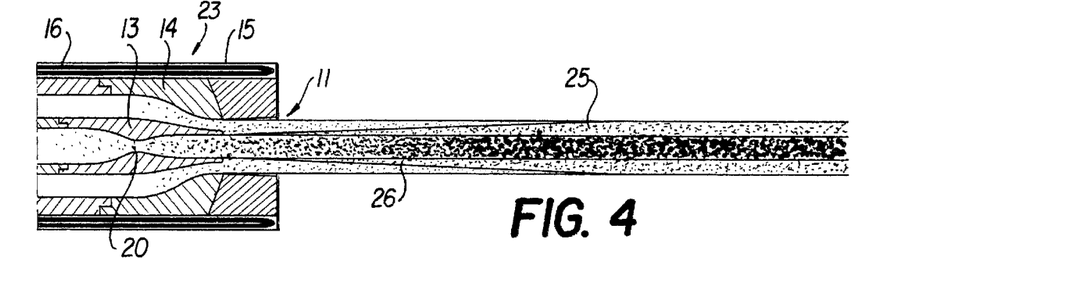
FIG. 4 shows a working diagram of the long flame function in the burner mode of the device shown in FIG. 1.

According to the invention, the device 10 can operate in burner mode with a variable stechiometric ratio and variable flame length, wherein the first convergent/divergent nozzle 13 is used as a Venturi tube to mix a combustible substance and a comburent substance, such as for example oxygen or air enriched with oxygen (FIG. 4).

When the device 10 is used as a burner, the second nozzle 14 can be employed, according to a variant, to emit a jet of oxygen, or air enriched with oxygen, in order to obtain a combustion in stages, and therefore to maintain the fuel/comburent ratio in the primary flow in sub-stechiometric conditions and to use the secondary comburent to complete combustion.

When the device 10 is used as a burner, the double nozzle configuration 13 and 14 allows to obtain a plurality of advantages, and also to reduce the formation of $NO_x$.

In the first place, it allows to increase the efficiency of the transfer of convective heat, and minimizes the excess of total comburent needed to complete combustion.

Moreover, it guarantees a high level of stability for the flame in a wide range of operating conditions, allowing to regulate the characteristics of the flame itself both in terms of length and in terms of diameter according to the type of furnace and the required processing parameters.

FIG. 4 shows an operating mode with a long flame, with the outer secondary annular jet 25 consisting of oxidant-rich gas which surrounds the inner primary jet 26 which is rich in combustible gas; this functioning is particularly useful for dissolving the scrap, in the initial steps of the cycle, which are in front of the outlet mouth 11 of the device 10.

According to the operating conditions of the process of metallurgical transformation, the performance of the burner can be regulated to modify the length of the flame and also the stechiometric ratios in the different zones of the flame.

Figure 5:
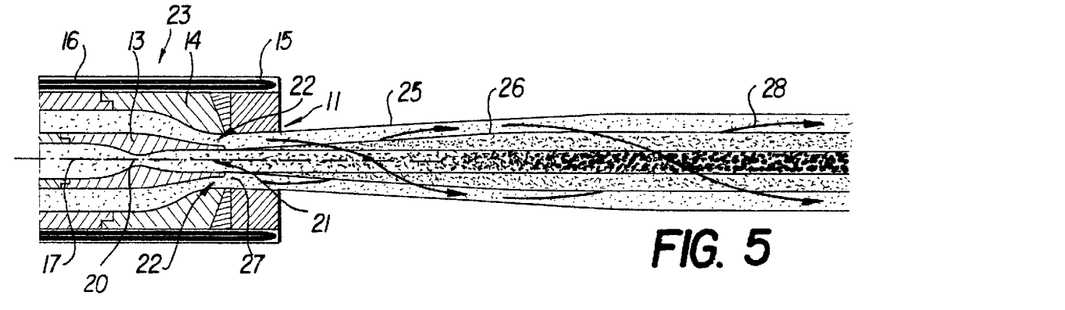
FIG. 5 shows a variant of FIG. 4.
Figure 6:
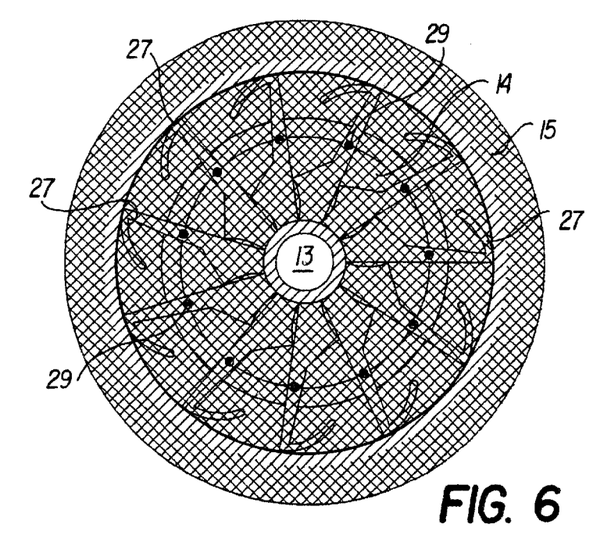
FIG. 6 is a front view of a working diagram of the embodiment shown in FIG. 5.

FIGS. 5 and 6 show a variant wherein, in correspondence with the terminal section 22 of the second nozzle 14 there are deflector elements 27.

These elements 27 rotate around a pin 29 and can assume a first, substantially horizontal position (shown by a line of dashes in FIG. 6), wherein they do not interact with the jets 25 and 26, allowing the long-flame configuration in burner mode, and a second position at least partly inclined (shown by a continuous line), wherein they reduce the outlet section of the second nozzle 14, generating a swirling movement of the second, outer jet (shown by the arrows 28).

According to the greater or lesser inclination of the deflector elements 27, and to the consequent greater or lesser partial closing of the outlet, the length and shape of the flame are regulated according to the desired result.

According to a further variant, at least the first nozzle 13 can be axially positioned with respect to the outlet mouth 11 of the device 10, which remains fixed, however, with respect to the wall of the furnace, for example retractable, in order to ensure the stability of the flame irrespective of the conditions which are established inside the furnace.

Moreover, the retractability of the first nozzle 13, if combined with the retractability of the second nozzle 14, allows to create a pre-combustion chamber of variable volume inside the emission element 23 which guarantees an efficient mix of the two gassy jets before they are introduced into the atmosphere of the furnace.

Figure 7:
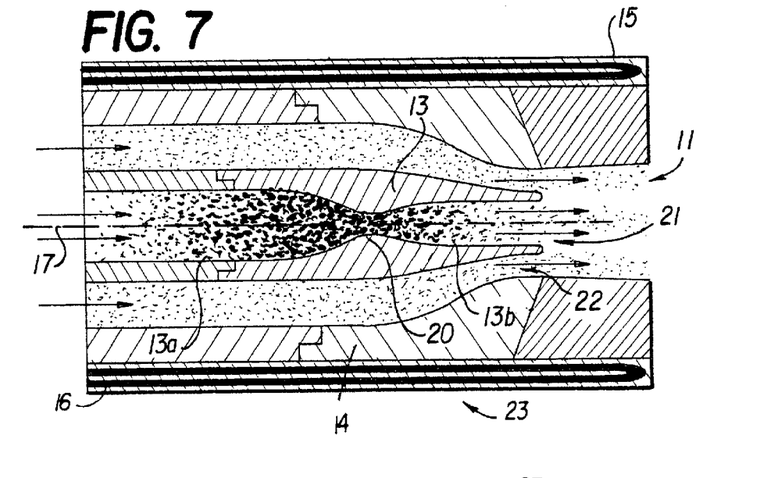
FIG. 7 shows a working diagram in the burner mode of the device according to the invention with fuel injection from the secondary channel.

In a further functioning mode, the second nozzle 14 is used to inject material in particles or in powder form mixed with a vector gas or a transporter gas (FIG. 7).

The material injected can also be a combustible material of a solid type in powder form or particles, or the atomized liquid type, or of the gassy type.

In this case, the primary nozzle 13 can be used to inject secondary comburent.

Figure 8:
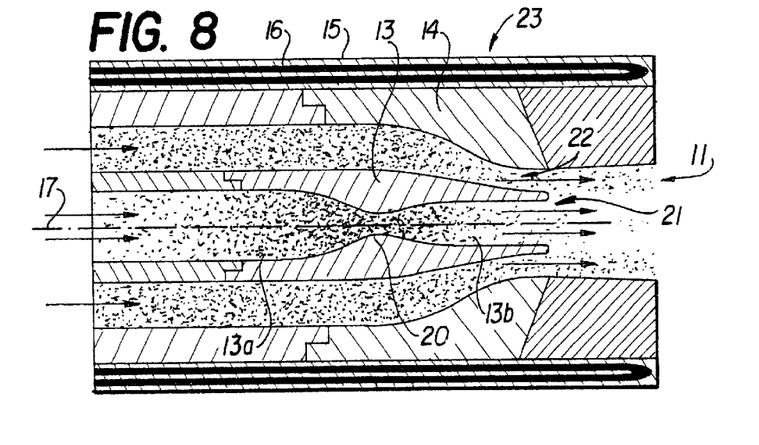
FIG. 8 shows a working diagram of the device according to the invention used to inject solid material in powder form and particles.

In the embodiment shown in FIG. 8, the second nozzle 14 is used to inject solid material, such as carbon powder or lime, on a fluid vehicle, for example an inert gas or similar.

This embodiment is particularly useful in order to increase the foamy slag effect and the recarburization of the liquid steel.

Moreover, a contribution of chemical energy is given, with a consequent saving in electric energy, and the composition of the slag is adjusted to values more suitable for the desired operating conditions inside the furnace.

Figure 9:
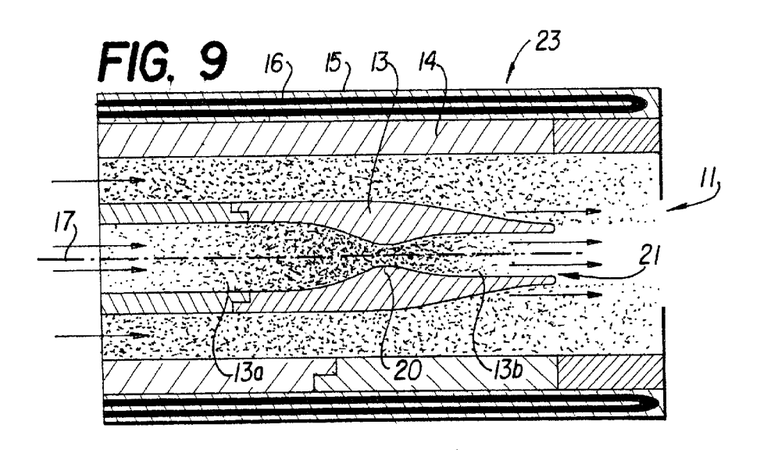
FIGS. 9, 10, 11 and 12 show variants of FIG. 8.

In this functioning mode, the emission element 23 can be replaced to modify the shape of the second nozzle 14 from a convergent configuration (FIG. 8), to non-convergent configurations (FIGS. 9, 12) with an outlet jet which is more or less parallel to the primary jet emitted by the first nozzle 13.

Figure 11:
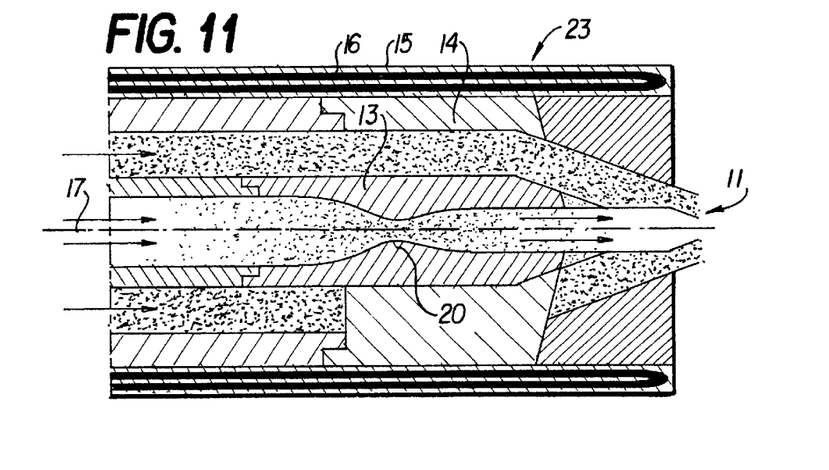

FIG. 11 shows a further configuration wherein the second nozzle 14 has characteristics of great convergence in order to encourage the transport of the solid fuel in powder form by means of the supersonic jet emitted by the first nozzle 13.

Figure 10:
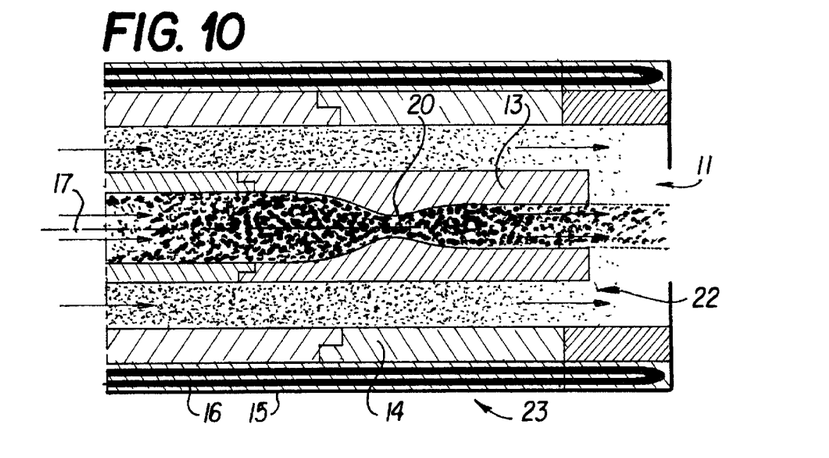

According to a further variant, the solid fuel in powder form is injected on a fluid vehicle through the first nozzle 13 (FIG. 10), while the second nozzle 14 can be used to emit a subsonic jet to protect the primary jet delivered by the first nozzle 13.

Figure 12:
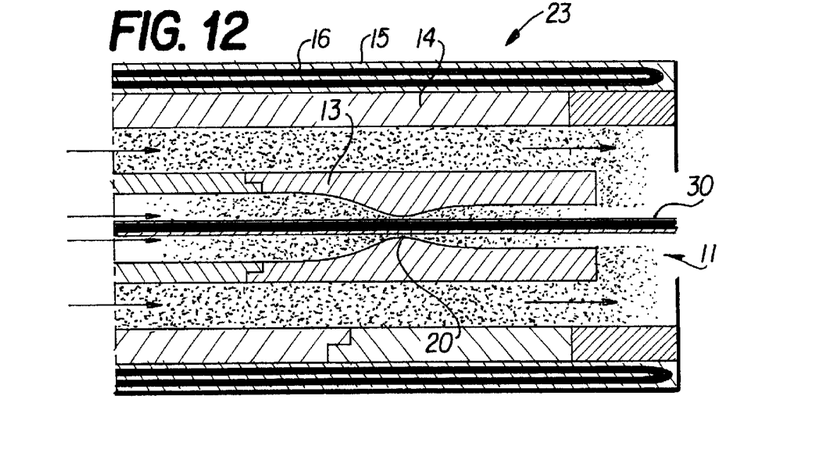

The first nozzle 13 can be used for the whole of its section or, as shown in FIG. 12, a thin axial channel 30 may be made inside it, for solid fuel to be injected; in this case, the thin axial channel 30 extends substantially as far as the outlet mouth 11 of the device 10.

The gassy jets emitted by the first nozzle 13 and the second nozzle 14 form annular crowns which protect and convey the jet of fuel delivered through the axial channel 30.

According to a preferential embodiment of the invention, the walls of the nozzles or channels used to inject solid fuel are lined, at least in correspondence with the bends, with wear-resistant and erosion-resistant material, for example, high resistance resins, ceramic linings or specific protective varnishes.

In the configurations shown in FIGS. 8–12, it is therefore possible to inject carbon powders (to produce foamy slag and to limit the power of the furnace), or lime powders or other material of a basic nature (to passivate the slag), at the same time as $O_2$ or other technological gases which are needed for the metallurgical treatment of the melting baths are injected.

It is clear from the above description what the characteristics and advantages of using the device 10 according to the invention are.

The device 10 is mounted fixed to the wall of the furnace, also with its outlet mouth 11 at a distance from the liquid bath, so that it does not require manipulators or the substitution of parts which are progressively consumed.

If the device 10 is used alternately in burner mode and simple oxygen lance mode, it is possible to open the road to the supersonic jet, for example dissolving the scrap and creating a direct passage towards the bath of liquid metal without deviations and reflections which cause energy losses and a slow down in the jet.

According to the specific effect to be obtained, the inclination of the lance can be varied, for example maintaining a lesser inclination during the pre-heating step, the descent of the scrap step, and the melting step, and a greater inclination in the decarburation step and the bath stirring step.

Apart from this, the quantity of motion in the primary jet, together with the protection effect caused by the secondary jet emitted by the second nozzle 14 causes the primary supersonic jet emitted by the first nozzle 13 to penetrate into the bath without dispersions and without loss of speed, maintaining a high level of efficiency, in the region of 100%, and preventing dangerous and harmful splashes of liquid metal.

The depression which is created in the liquid bath, due to the pressure and dynamic impulse created by the supersonic jet, causes an increase in the speed of decarburation due to the increase in local and overall stirring of the bath and the consequent increased exchange of mass and energy.

This improved stirring and uniformity of the bath deriving from the turbulence caused by the supersonic jet increases the spreading process in correspondence with the interface between the slag and the metal, which entails a reduced demand for electric energy and an increase in the speeds of decarburation.

The increase in decarburation then allows a greater use of the device 10 for the high efficiency injection of carbon powder, causing a further input of chemical energy with an improved slag foaming effect and a consequent greater efficiency of the arc, reduction of electrode consumption, and reduction of energy losses through the cooling elements of the furnace.

Moreover, the quantity of motion of the primary supersonic jet emitted by the first nozzle 13 generates a zone wherein the post-combustion caused by the second subsonic jet delivered by the second nozzle 14 can be carried out without contact with the slag or the metal, but in a zone in close proximity with the slag itself, thus increasing the efficiency of the reaction from a value of around 35% to a value of 75% and more.

The energy deriving from the post-combustion process is transferred to the drops of metal trapped between the slag by conduction, instead of by radiance as traditionally happens.

When the drops of metal return to the liquid bath, they transfer their energy content to it, further reducing the demand for electric energy.

The fact that it is possible to inject carbon or lime through the device 10, even autonomously and independently with respect to the supersonic jet of oxygen, increases the flexibility and versatility of the device 10 with respect to the variation in the conditions of the furnace to obtain the desired quality of the final product.

What is claimed is:

1. A device to inject at least one gas selected from the group consisting of oxygen, gases containing oxygen, and other technological gases and a solid material in powder form, in a furnace used in steel and metallurgical melting processes for forming a liquid metal bath, comprising:

a body suitable to be mounted fixed in an aperture made on the wall of the furnace, an emission element being housed at an end of said body, said emission element including an outlet mouth for being arranged, in an operating position, at a certain distance from an upper level of the liquid bath, said emission element having a longitudinal axis, and said body having an outer containing shell inside which are defined circulation channels for a cooling fluid, a radially inner portion of said emission element being shaped as a double nozzle, respectively a first inner nozzle and a second nozzle, said second nozzle being annularly outside said first nozzle and substantially co-axial with said first nozzle, the first nozzle having a first terminal section and a convergent/divergent conformation defined by a neck located at a position upstream of the first terminal section and being predisposed for the emission of a jet of gas at supersonic speed, wherein said second nozzle has a second terminal section having a downstream end, and the downstream end has a conformation convergent towards the longitudinal axis of the emission element and is pre-disposed for the emission of a jet at subsonic speed of a member of the group consisting of oxygen alone, gases containing oxygen, other technological gases, solid material in powder form carried by a carrier gas, and liquid in atomized form.

2. The device as in claim 1, wherein said first nozzle has said first terminal section and said second nozzle has said second terminal section, said terminal sections being arranged inside said outlet mouth of said emission element.

3. The device as in claim 1, wherein said outlet mouth is arranged at a height of between about 0.5 and 2.5 m with respect to the surface of the bath.

4. The device as in claim 1, further comprising valve means suitable to regulate the outlet speed of the gas at least from said first nozzle according to the conditions of pressure/temperature/density inside the furnace so that the expansion of said gas occurs completely inside said emission element.

5. The device as in claim 1, wherein said first nozzle terminal section has inner circumferential grooves to stabilize a sublayer of the primary supersonic jet which is nearest the wall.

6. The device as in claim 1, wherein the second nozzle has an outlet section which is circular or elliptic in shape.

7. The device as in claim 1, wherein within the outlet section of the second nozzle there are deflector elements with at least an operating position suitable to partly reduce the gassy flow leaving said second nozzle to generate a swirling movement of the flow with the purpose of regulating at least one member of the group consisting of the length and the shape of the jet emerging from the first nozzle.

8. The device as in claim 1, wherein at least the first nozzle is axially movable with respect to the outlet mouth of the emission element.

9. The device as in claim 1, wherein the second nozzle is axially movable with respect to the outlet mouth of the emission element.

10. The device as in claim 1, wherein at least one member of the group consisting of the first nozzle and the second nozzle are at least partly lined on the inside with wear-resistant and/or erosion-resistant material.

11. The device as in claim 10, wherein the wear-resistant and/or erosion-resistant material is ceramic material or high-resistance resins or special varnish.

12. The device as in claim 1, further comprising a channel to feed solid fuel in powder form or particles into the first nozzle.

13. The device as in claim 1, having an axis for orienting with respect to the surface of the liquid bath, said axis defining an angle of between 30° and 70° with respect to said surface.

14. A method to use the device to inject at least one gas selected from the group consisting of oxygen, gases containing oxygen, and other technological gases and solid material in powder form of claim 1 comprising:

providing the device of claim 1;

performing a melting process to form a liquid metal bath and, while the melting process is in progress, using the device in at least one operating step selected from the group consisting of:

injecting a gassy jet at supersonic speed through said first convergent/divergent nozzle and a jet of transporting/protecting gas at subsonic speed through said second nozzle, and injecting a gassy jet at supersonic speed through said first convergent/divergent nozzle and of solid material in powder form through said second nozzle.

15. The method as in claim 14, further comprising operating the device in a burner step comprising burning with variable stochiometric ratios of oxygen and combustible substance and variable flame length by means of injecting at least a gas containing said oxygen through one of the two nozzles and injecting said combustible substance through the other of said nozzles.

16. The method as in claim 14, wherein the device is employed to measure the pressure of the supersonic jet delivered by the first nozzle at least at a position upstream of the neck and at a position in correspondence with said neck, and to regulate in feedback the emission pressure by means of valve means located upstream of said first nozzle.

17. The method as in claim 14, wherein in the burner step, the first nozzle is a convergent/divergent nozzle used as a Venturi tube to mix a substance, selected from the group consisting of oxygen or air enriched with oxygen, with a combustible substance.

18. The method as in claim 17, wherein in the burner step, the second nozzle emits a jet of oxygen-containing gas to maintain the fuel/oxygen ratio in the primary flow delivered by the first nozzle in sub-stochiometric conditions and to complete combustion.

19. The method as in claim 14, wherein prior to said at least one operating step the device delivers a supersonic jet through the first nozzle of a combustible gas and a subsonic jet through the second nozzle of an oxidant-rich gas, to cause scrap to descend in front of the outlet mouth of the emission element.

20. The method as in claim 15, wherein the device regulates the length and/or shape of the flame emitted by the device in the burner step by partly reducing the flow emerging from the second nozzle by means of deflector elements with adjustable positioning.

21. The method as in claim 14, comprising regulating the length and/or shape of a flame emitted by the device in the burner step by varying the longitudinal axial positioning of the first and/or the second nozzle with respect to the outlet mouth of the emission element.

22. The method as in claim 14, wherein during said injecting of said gassy jet at supersonic speed through said first convergent/divergent nozzle and of solid material in powder form through said second nozzle, the second nozzle injects said solid material in powder form selected from the group consisting of carbon or lime powder, on a fluid carrier selected from the group consisting of a gas or a liquid to increase the foaming effect of the slag and the recarburization of the liquid steel, while the first nozzle emits a supersonic gassy jet of oxygen and/or other technological gases.

23. The method as in claim 14, wherein during said injecting of said gassy jet at supersonic speed through said first convergent/divergent nozzle and of solid material in powder form through said second nozzle, the second nozzle is used to inject a subsonic gassy jet for protective and/or transporting purposes, while the first nozzle is used to inject solid materials in powder form or particles on a fluid vehicle.

24. The method as in claim 14, wherein, as the melting proceeds, the level of the surface of the liquid bath varies and the inclination of the device is varied with respect to the surface of the bath to follow the variation in the level of the liquid bath and to maintain the angle of incidence of the jet substantially constant, to prevent the jet being reflected.

25. The device as in claim 1, wherein said the first inner nozzle and a second nozzle each have a respective outlet mouth and the respective outlet mouths of the two nozzles are substantially aligned on the same transverse plane, or with the first inner nozzle mouth ending farther downstream than the mouth of the second nozzle.

26. The device as in claim 1, wherein the device has an axis which is orientable with respect to the surface of the liquid bath, said axis defining an angle of between 40° and 50° with respect to said surface of the liquid bath.

* * * * *